July 26, 1932.  W. W. WOLFF ET AL  1,868,785
LIFTING JACK MECHANISM FOR VEHICLES
Filed March 9, 1931   2 Sheets-Sheet 1

INVENTORS
William W. Wolff
BY Robert W. Wolff
Westall and Wallace
ATTORNEYS

July 26, 1932. W. W. WOLFF ET AL 1,868,785
LIFTING JACK MECHANISM FOR VEHICLES
Filed March 9, 1931 2 Sheets-Sheet 2
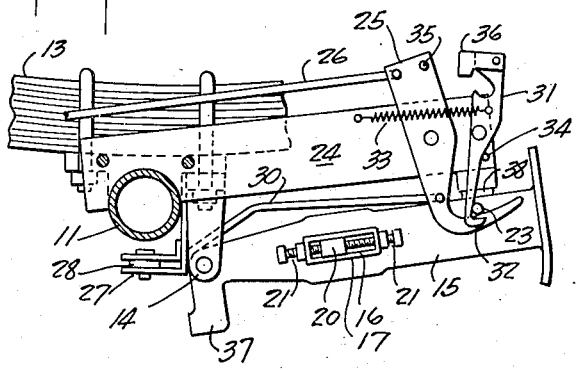
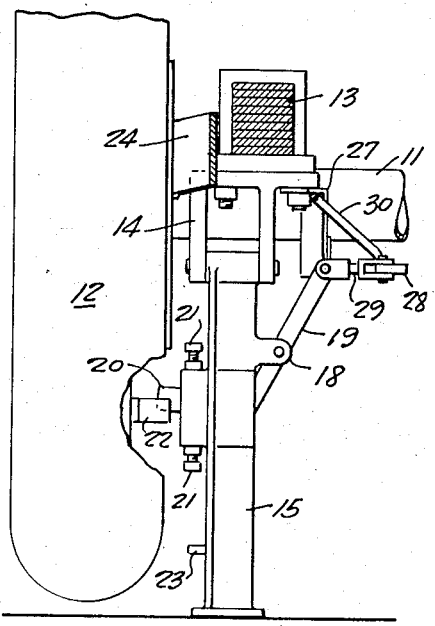
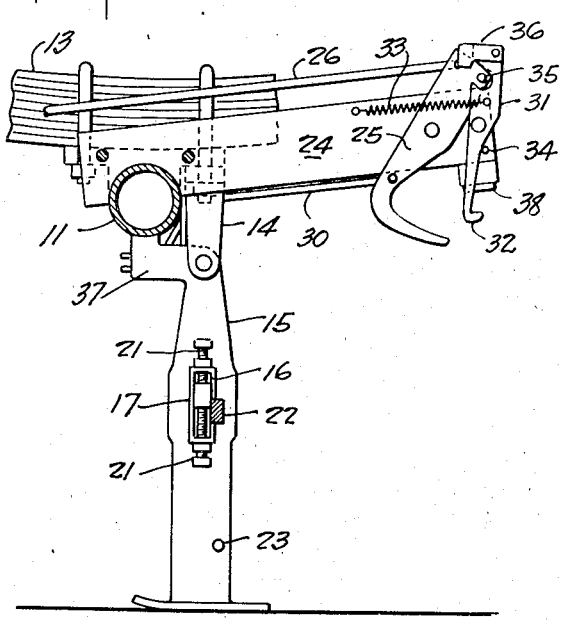
INVENTORS
William W. Wolff
BY Robert W. Wolff
Westall and Wallace
ATTORNEYS Patented July 26, 1932

1,868,785

UNITED STATES PATENT OFFICE

WILLIAM W. WOLFF AND ROBERT W. WOLFF, OF LOS ANGELES, CALIFORNIA, ASSIGNORS OF ONE-THIRD TO THOMAS E. WATSON, OF LOS ANGELES, CALIFORNIA

LIFTING JACK MECHANISM FOR VEHICLES

Application filed March 9, 1931. Serial No. 521,142.

This invention relates to lifting means for an automotive vehicle whereby the vehicle may be elevated off the ground by using the tractive power of the vehicle. It appertains to a prop which is carried by the vehicle and may be selectively released to ground engaging position and the vehicle driven under power so that the prop acts as a lever fulcruming about its foot. In vehicles having driving wheels capable of operating at differential speed, which is the common practice, lifting one of the traction wheels from the ground destroys the tractive effort of the other unless the lifted wheel is held against rotation. The present invention contemplates a prop associated with a wheel so that when it is actuated to lift a wheel clear of the ground, the lifted wheel is held against rotation enabling the other to exert its tractive effort.

The objects of this invention are to provide lifting jack mechanism of the character above mentioned and having any or all of the following features: means on the wheel associated with a prop whereby the latter engages a wheel when the prop is in lifting position and arrests rotation of the wheel in one direction; means as described which by rotation of the wheel in the opposite direction will restore the prop to nonlifting or carrying position; a protractable and retractable lug on said prop for engagement by said means whereby the lug may be positioned to clear the means or positioned to engage the means; automatic catch means for engaging and holding the prop in carrying position and manually operable to release the prop; and details of structure contributing to positiveness of operation, ease of control, sturdiness of structure and compactness in installation.

These objects are obtained by the embodiment of our invention illustrated in the accompanying drawings, in which:—

Figure 1:
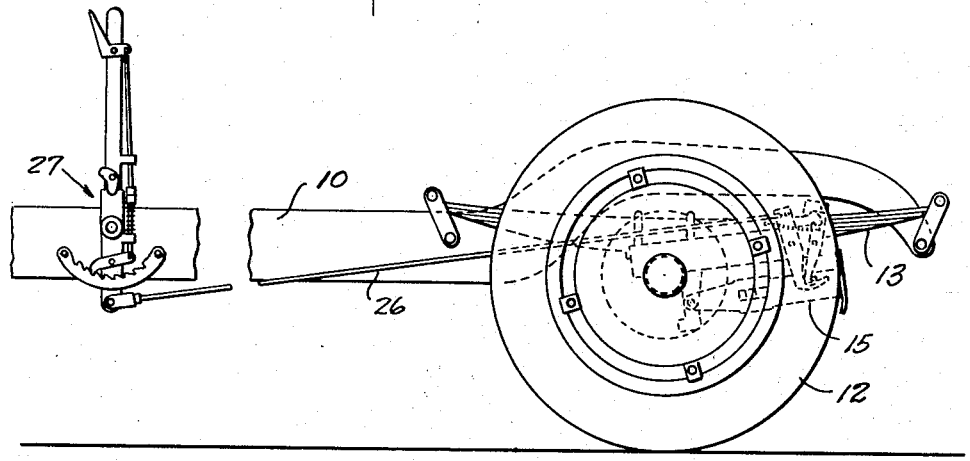
Figure 2:
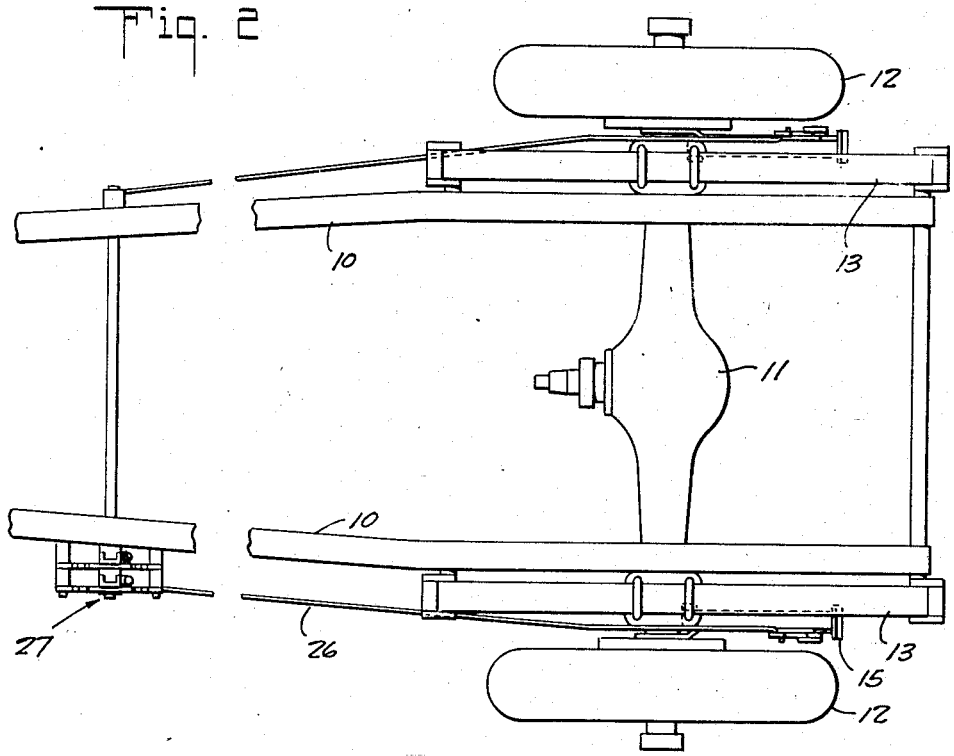

Fig. 1 is a side elevation of the rear or driving end of an automobile chassis with the lifting mechanism mounted thereon; Fig. 2 is a plan view of the structure shown in Fig. 1; Fig. 3 is a side elevation of a lifting prop with the catch holding the prop in carrying position; Fig. 4 is a plan view of the structure shown in Fig. 1, a fragment of the wheel being shown in cross section; Fig. 5 is a side view of the structure shown in Fig. 3 with the prop in lifting position; and Fig. 6 is a rear elevation of a fragment of an automobile with a wheel and its prop in lifting position.

In an automobile a prop will be provided for each driving wheel. A prop will also be provided for the front axle. However, the props at the rear and associated with the driving wheels embody the invention. These props are controlled by a handle or handles conveniently located for operation by the driver. As the props at the rear are alike, one will be described.

An automobile frame is provided with side bars 10 and a rear axle having a housing 11. The axle is of a common differential type so that wheels 12 may have a differential speed. This type of construction is such that when one wheel loses its traction, it will spin, and there will be no tractive effort on the other wheel. The axle is supported by the usual semi-elliptic springs 13. The construction just described is part of a standard type of automobile.

Secured to the spring seat is a bracket 14. The bracket has spaced depending ears between which is pivotally mounted a jack prop 15. It will be noted that the prop 15 is disposed on a pivotal axis eccentric to the axle. An elongated slot 16 extends through the prop and at the outer face of the prop at the slot there is an enlargement 17. On the inner face of the prop intermediate the slot 16 and the pivotal axis are ears 18. A lever arm 19 is pivotally mounted between the ears and carries at its lower end a lug block 20. By swinging the arm 19, the lug block may be projected outwardly from the outer side of the prop or retracted inwardly. Limiting screws 21 restrain the lug block to a reciprocatory movement at a selected level with respect to the foot of the prop and the level may be adjusted by means of the screws. The lug block 20 is for coaction with a lug 22 on the wheel 12. With the lug block projected, the lug 22 on wheel 12 will abut the lug block when the prop is in elevating position as shown in Figs. 5 and 6. This will cause the wheel 12 to be restrained against rotation. By suitably positioning the pivotal axis of the prop with respect to the axis of the wheel, the projected lug block 20 will clear the lug 22 when in carrying position as shown in Fig. 4. However, to insure clearance, the lug block 20 has been made retractable.

In order to hold the prop in carrying position and to release it when so desired, a keeper pin 23 is provided on the outer face of the prop. A catch mounting plate 24 is secured in position with relation to the axle housing 11 by mounting it upon the spring seat. Plate 24 extends rearwardly so as to overhang the prop. Pivotally mounted upon the plate is a catch 25. This catch is of hook form and constitutes a retaining catch which is manually operable.

An operating rod 26 is secured to catch 25 and at its forward end is secured to a hand lever mechanism indicated generally by 27. This hand lever mechanism is disposed in the car at a point convenient for operation by the driver of the vehicle and may be arranged so that a demountable handle may be used to operate linkage for the wheel on the opposite side. As this mechanism is not pertinent to the present invention, it is not described in detail. Mounted upon the bracket 14 is a pivot support 27 and pivotally mounted thereon is an arm 28 having a clevis. A swivel link 29 secures lever 19 to arm 28 whereby the prop 15 may be swung. A link rod 30 is secured to arm 28 intermediate its ends and to the catch 25. Thus, operation of the catch 25 by the rod 26 to retract it and release pin 23 will position the lug block 20 in projected position. When the parts are in position to engage the pin 23 as shown in Fig. 3, the lug block 20 will be in retracted position. The lug block 20 and lug 22 are so positioned that when the prop is raised, the lug and lug block will not clear until the prop is in carrying position, as shown in Fig. 3. This enables the prop to be raised by rotation of the wheel 12, the lug and lug block being in engagement until the prop has reached carrying position.

In order to automatically catch and initially hold the prop in carrying position, an initial catch 31 is provided. This catch is of hook form and pivoted on the supporting plate 24 in the rear of catch 25. It has a hook end to engage pin 23 and a bevel lower lip 32. A tension spring 33 holds the catch 31 against a stop pin 34 on the supporting plate. A pin 35 on catch 25 is disposed so that upon swinging of the catch it may be engaged with a dog 36 pivotally mounted on initial catch 31 and will swing it to releasing position. The dog may be lifted and on withdrawal of latch 25, pin 35 may pass the dog without disturbing catch 31.

In carrying position of the prop, it is in the position shown in Figs. 1, 2 and 3. To elevate the car and raise a wheel from the car, the hand lever mechanism 27 associated with rod 26 of the wheel is actuated to move rod 26 toward the rear. This causes the retaining catch 25 to be swung so as to release its hold upon pin 23 and in its final swinging position, it actuates initial catch 31 to release it. The prop is then free to drop and engage its foot with the ground. A shoulder projection 37 on the prop acts as a stop coacting with the axle housing. The car is then backed up. Traction for backing is maintained after the wheel associated with the jack has been raised by reason of lug 22 engaging the lug block 20. The operation of the catch to release the prop will have caused the lug block 20 to be projected. To raise the jack, the car is driven forward, the lug 22 engaging the other side of the lug block and swinging the jack upwardly, pin 23 engaging the bevel lip 32 of the initial catch and riding over the latter into locking position. Final retention of the prop is obtained by operating the hand lever mechanism 27 and causing catch 25 to engage pin 23. The prop is forced upwardly by the catch and held against a rubber bumper 38. This prevents rattling of the prop when in carrying position.

A plurality of props are provided, one for the front axle and one of each rear wheel. These can be arranged to be operated selectively by the hand lever mechanism 27.

What we claim is:—

1. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to frame elevating position, and means on said wheel to engage said prop in frame elevating position and arrest rotation thereof in one direction and to swing said prop to carrying position on rotation of said wheel in the other direction.

2. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to frame elevating position, means on said wheel to engage said prop in frame elevating position and arrest rotation thereof in one direction and to swing said prop to carrying position on rotation of said wheel in the other direction, and releasable catch means on said frame to hold said prop in carrying position.

3. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop carrying position to frame elevating position, means on said wheel to engage said prop in frame elevating position and arrest rotation thereof in one direction and to swing said prop to carrying position on rotation of said wheel in the other direction, catch means on said frame to automatically engage said prop and hold the latter in carrying position, and manually operable means to actuate said catch means and release said prop.

4. In an automotive vehicle including a frame, an axle, and drive wheels capable of differential speed: a lifting jack mechanism comprising a jack prop pivotally supported in relation to said frame on an axis located adjacent a wheel whereby to enable swinging of the prop to and from frame elevating position, a projectable and retractable lug on said prop, a lug on said wheel to engage the lug on said prop in frame elevating position and arrest rotation thereof in one direction, and manually controlled means to retract the lug on said prop and cause it to clear the lug on said wheel.

5. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to elevating position, a projectable and retractable lug on said prop, a lug on said wheel to engage the lug on said prop in frame elevating position and arrest rotation thereof in one direction, and manually controlled means to retract the lug on said prop and cause it to clear the lug on said wheel.

6. In an automotive vehicle including a frame, an axle, and drive wheels capable of differential speed: a lifting jack mechanism comprising a jack prop pivotally supported in relation to said frame on an axis located adjacent a wheel whereby to enable swinging of the prop to and from frame elevating position, means on said wheel to engage said prop in frame elevating position and arrest rotation of said wheel in one direction, manually operable retaining catch means to selectively engage and hold said prop in carrying position or to release said prop, and automatic catch means to initially engage and hold said prop in carrying position, said automatic catch means being operable by said retaining catch in its final release position to release said prop.

7. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to frame elevating position, means on said wheel to engage said prop in frame elevating position and arrest rotation thereof in one direction and to swing said prop to carrying position on rotation of said wheel in the other direction; manually operable retaining catch means to selectively engage and hold said prop in carrying position or to release said prop, and automatic catch means to initially engage and hold said prop in carrying position, said automatic catch means being operable by said retaining catch in its final release position to release said prop.

8. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to frame elevating position, means on said wheel to engage said prop in frame elevating position and arrest rotation thereof in one direction and to swing said prop to carrying position on rotation of said wheel in the other direction, manually operable retaining catch means on said frame to selectively hold said prop either in carrying position or to release said prop, automatic catch means to initially engage and hold said prop in carrying position, means on said retaining catch to engage said initial catch at the end of the release movement of said retaining catch and actuate said initial catch to release said prop.

9. In an automotive vehicle including a frame, an axle, and drive wheels capable of differential speed: a lifting jack mechanism comprising a jack prop pivotally supported in relation to said frame on an axis located adjacent a wheel whereby to enable swinging of the prop to and from frame elevating position, a projectable and retractable lug on said prop, a lug on said wheel to engage the lug on said prop in frame elevating position and arrest rotation thereof in one direction, manually controlled means to retract the lug on said prop and cause it to clear the lug on said wheel, manually operable retaining catch means to selectively engage and hold said prop in carrying position or to release said prop, and automatic catch means to initially engage and hold said prop in carrying position, said automatic catch means being operable by said retaining catch in its final release position to release said prop.

10. In an automotive vehicle including a frame, an axle, and drive wheels capable of differential speed: a lifting jack mechanism comprising a jack prop pivotally supported in relation to said frame on an axis located adjacent a wheel and eccentric to the wheel axis whereby to enable swinging of the prop from carrying position to elevating position, a projectable and retractable lug on said prop, a lug on said wheel to engage the lug on said prop in frame elevating position and arrest rotation thereof in one direction, manually controlled means to retract the lug on said prop and cause it to clear the lug on said wheel, manually operable retaining catch means on said frame to selectively hold said prop either in carrying position or to release said prop, automatic catch means to initially engage and hold said prop in carrying position, means on said retaining catch to engage said initial catch at the end of the release movement of said retaining catch and actuate said initial catch to release said prop.

In witness that we claim the foregoing we have hereunto subscribed our names this 3rd day of March, 1931.

WILLIAM W. WOLFF.
ROBERT W. WOLFF.